3,129,206
POLYMERIZATION PROCESS
Andrzej Pajaczkowski, Harpenden, England, assignor to Imperial Chemical Industries Limited, London, England, a corporation of Great Britain
No Drawing. Filed Aug. 5, 1960, Ser. No. 47,615
Claims priority, application Great Britain Feb. 14, 1958
7 Claims. (Cl. 260—88.7)

This invention relates to improvements in the polymerization of ethylenically unsaturated compounds.

It is known to use certain peroxy compounds, including diacyl peroxides, as catalysts, or initiators, for the polymerization of ethylenically unsaturated compounds. Diacyl peroxides that have been found to be particularly useful for this purpose include diacetyl, dilauroyl and dibenzoyl peroxides.

According to the present invention we provide a process for the polymerization of a compound containing the group $>C=CH_2$, wherein at the most one of the free linkages is satisfied by a hydrogen atom, said process being characterized in that it is carried out in the presence of a catalytic amount of 3,5,5-trimethylhexanoyl peroxide.

Besides being a highly efficient catalyst, with a half-life of 125 mins. at 80° C., 3,5,5-trimethylhexanoyl peroxide has certain advantages over acetyl, benzoyl and lauroyl peroxides, which have been commonly used hitherto; for example, it is a liquid under normal conditions and has a greater solubility in the monomers to be polymerized and is therefore more easily handled and more easily dispersed in the monomer. It is also substantially completely odourless.

3,5,5-trimethylhexanoyl peroxide can be prepared from 3,5,5-trimethylhexanoic acid (which may in turn be produced from 3,5,5-trimethylhexanol or 3,5,5-trimethylhexanal as made by the well-known oxo hydroformylation process) by any of several well known chemical methods, for example by converting the acid to its chloride and reacting the latter with hydrogen peroxide in the presence of a base.

Monomers that may advantageously be polymerized or copolymerized with each other by the process of this invention include for example: vinyl chloride; vinyl esters, for example vinyl acetate; vinyl phthalimide; acrylic monomers, for example methyl methacrylate, methyl acrylate and acrylonitrile; styrene; diallyl esters; vinylidene chloride; and dienes such as butadiene. The process may be carried out as a conventional polymerization process for the particular monomer, e.g. bulk, solution, granular or emulsion, with 3,5,5-trimethylhexanoyl peroxide replacing the conventional catalyst. Polymerization temperatures of between 25 and 100° C. will normally be used. The pressure may vary over a wide range, e.g. from 1 to several atmospheres, e.g. 25 atmospheres, in accordance with the normal practice with the monomer concerned. Our catalyst will normally be used in amounts of from 0.01% to 2.0% by weight of the monomeric material. It may be used, if desired, together with an activator, that is a compound that promotes the decomposition of peroxides, e.g. a reducing agent in the well-known redox systems. Other conventional ancillary ingredients may be present, e.g. chain transfer agents, pigments, plasticisers etc.

Our invention is illustrated but in no way limited by the following examples, in which all parts given are by weight. The catalyst used in each of the examples was prepared in the following manner:

To a mixture of 17 vols. of 3,5,5-trimethylhexanoyl chloride and 8 vols. of 100-volume hydrogen peroxide cooled to 0° C. were added in small portions and with constant stirring and cooling 8 vols. of pyridine. After the addition was complete, the mixture was stirred for 1 hour at 0° C. The organic layer was separated, washed with water and with a solution of sodium bicarbonate, diluted with ether and dried over anhydrous calcium chloride. Ether was removed; the residue (11 vols.) was a liquid of refractive index ($n_D^{20}$) 1.4382, had an infrared spectrum showing it to consist principally of 3,5,5-trimethylhexanoyl peroxide (carbonyl absorption at 1818 and 1785 cm,$^{-1}$), liberated iodine from acidified aqueous potassium iodide, and evolved gas on being heated to 95° to 115° C.

Example 1

100 parts of acrylonitrile were mixed with 1 part of 3,5,5-trimethylhexanoyl peroxide, present as a 1% w./v. solution in white spirit, and heated at 70° C. in an atmosphere of nitrogen. After 15 minutes the mixture had solidified to white polymer.

Example 2

100 parts of methyl methacrylate were mixed with 1 part of 3,5,5-trimethylhexanoyl peroxide, present as a 1% w./v. solution in white spirit, and heated at 80° C. in an atmosphere of nitrogen. After 2 hours the mixture had solidified to a colourless, vitreous polymer.

Example 3

100 parts of styrene were mixed with 0.3 part of 3,5,5-trimethylhexanoyl peroxide, present as a 3% w./v. solution in white spirit, and heated at 80° C. in an atmosphere of nitrogen. After 3 hours the mixture had solidified to a colourless vitreous polymer.

Example 4

Into a stirred stainless steel autoclave were charged 240 parts of water, 0.42 part of gelatin and 0.24 part of 3,5,5-trimethylhexanoyl peroxide. The autoclave was closed and the contained air replaced with nitrogen. 120 parts of vinyl chloride were then charged and the vessel was heated to, and maintained at, a temperature of 50° C. The stirrer was driven at 720 r.p.m. After 16 hours the residual monomer was vented and the suspended polymer filtered from the aqueous phase, washed and dried. 87% conversion of monomer was obtained.

Example 5

0.1 part of 3,5,5-trimethylhexanoyl peroxide were dissolved in 100 parts of methyl methacrylate and the mixture heated at 40° C. until it turned into a hard block, whereupon the temperature was raised to 110° C. and maintained at this temperature for 1 hour to complete polymerization of the monomer. The resulting product was a hard, transparent polymer having a Vicat softening point of 122° C.

Example 6

159 parts of acrylonitrile were mixed with 0.20 part of 3,5,5-trimethylhexanoyl peroxide, present as a 0.025% w./v. solution in toluene, and heated at 70° C. in an atmosphere of nitrogen. After 1.25 hours the mixture was poured into methanol and the solid precipitate was removed by filtration, washed with methanol and dried to give 52 parts of polyacrylonitrile.

For comparison purposes, Example 6 was repeated replacing the catalyst used therein by an equal quantity of lauroyl peroxide, and extending the reaction time at 70° C. to 4½ hours. The yield of polymer was 3.2 parts only.

Example 7

94 parts of methyl methacrylate were mixed with 0.2 part of 3,5,5-trimethylhexanoyl peroxide present as a 0.2% w./v. solution in toluene, and heated at 80° C. in an atmosphere of nitrogen. After 2 hours the mixture was poured into methanol and the solid precipitate was removed by filtration, washed with methanol and dried to give 46.4 parts of polymethyl methacrylate.

*Example 8*

90 parts of styrene were mixed with 0.02 part of 3,5,5-trimethylhexanoyl peroxide present as a 0.02% w./v. solution in toluene, and heated to 80° C. in an atmosphere of nitrogen. After 2.5 hours the mixture was poured into methanol and the solid precipitate was removed by filtration, washed with methanol and dried to give 29.6 parts of polystyrene.

For comparison purposes, Example 8 was repeated, replacing the catalyst used therein by an equal quantity of lauroyl peroxide. The yield of polymer was 15 parts only.

This application is a continuation-in-part of Serial No. 791,285, filed February 5, 1959, and now abandoned in favor of a further continuation-in-part thereof, namely, Serial No. 73,486, filed December 5, 1960, and issued as U.S. Patent 3,019,214.

I claim:

1. In a process for the polymerization of a monomer selected from the group consisting of vinyl chloride, vinyl acetate, vinyl phthalimide, methyl methacrylate, methyl acrylate, acrylonitrile, styrene, diallyl esters, vinylidene chloride and butadiene, the improvement which comprises polymerizing said monomer in the presence of from 0.01% to 2.0% by weight of 3,5,5-trimethylhexanoyl peroxide.

2. A process according to claim 1 wherein the temperature is between 25° and 100° C.

3. A process according to claim 2 wherein said polymerization is carried out at a temperature between 25° and 100° C. and a pressure between 1 and 25 atmospheres.

4. A process according to claim 1 wherein said compound is acrylonitrile.

5. A process according to claim 1 wherein said compound is styrene.

6. A process according to claim 1 wherein said compound is methyl methacrylate.

7. A process according to claim 1 wherein said compound is vinyl chloride.

References Cited in the file of this patent
UNITED STATES PATENTS 2,366,306    Alexander et al. _____ Jan. 2, 1945